United States Patent

Seok et al.

(10) Patent No.: US 8,782,446 B2
(45) Date of Patent: Jul. 15, 2014

(54) SECURITY OF CRYPTOGRAPHIC DEVICES AGAINST DIFFERENTIAL POWER ANALYSIS

(75) Inventors: Mingoo Seok, New York, NY (US); Jing-Fei Ren, Plano, TX (US); Manish Goel, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 374 days.

(21) Appl. No.: 13/353,462

(22) Filed: Jan. 19, 2012

(65) Prior Publication Data

US 2013/0191652 A1 Jul. 25, 2013

(51) Int. Cl.
*G06F 1/00* (2006.01)
*G06F 11/30* (2006.01)
*G06F 21/55* (2013.01)
*G06F 1/26* (2006.01)

(52) U.S. Cl.
CPC ............... *G06F 21/558* (2013.01); *G06F 1/26* (2013.01)
USPC .......................................... 713/300; 713/340

(58) Field of Classification Search
CPC ................................. G06F 1/26; G06F 21/558
USPC .................................................. 713/300, 340
See application file for complete search history.

(56) References Cited

U.S. PATENT DOCUMENTS

| 6,766,455 | B1 | 7/2004 | Ryan, Jr. | |
|---|---|---|---|---|
| 2004/0150382 | A1 | 8/2004 | Takabayashi | |
| 2005/0218872 | A1 | 10/2005 | Wich | |
| 2005/0240782 | A1 | 10/2005 | Hubert | |
| 2007/0035285 | A1 | 2/2007 | Balakrishnan et al. | |
| 2010/0102632 | A1* | 4/2010 | Jochmann et al. | 307/52 |
| 2011/0085662 | A1 | 4/2011 | Myers et al. | |
| 2012/0105162 | A1* | 5/2012 | Chou et al. | 331/117 FE |
| 2014/0016384 | A1* | 1/2014 | Sun | 363/124 |

OTHER PUBLICATIONS

Introduction to differential power analysis Paul Kocher• Joshua Jaffe • Benjamin Jun • Pankaj Rohatgi Published: Mar. 3, 2011.*

* cited by examiner

*Primary Examiner* — Kambiz Zand
*Assistant Examiner* — Benjamin Kaplan
(74) *Attorney, Agent, or Firm* — John R. Pessetto; Frederick J. Telecky, Jr.

(57) ABSTRACT

An embodiment of the invention provides a cryptographic device that draws a substantially constant current from an accessible electrical node that supplies power to the cryptographic device. Keeping the current drawn from the accessible electrical node substantially constant reduces the probability that secure information may be taken by unwanted third parties from the cryptographic device. The cryptographic device includes an active shunt current regulator, a low-pass filter, a linear voltage regulator and an AES (advanced encryption standard) circuit.

5 Claims, 3 Drawing Sheets

SECURITY OF CRYPTOGRAPHIC DEVICES AGAINST DIFFERENTIAL POWER ANALYSIS

BACKGROUND

Cryptography is the practice and study of techniques for secure communication in the presence of third parties (often called adversaries). More generally, cryptography is about constructing and analyzing protocols that overcome the influence of adversaries and which are related to various aspects in information security such as data confidentiality, data integrity and authentication. Applications of cryptography include ATM cards, computers and personal digital assistants (PDAs).

Encryption is the process of converting ordinary information (often called plain text) into unintelligible gibberish (often called cipher text). Decryption is the reverse; moving from the unintelligible cipher text back to plain text. A cipher (or cypher) is a pair of algorithms that create the encryption and the reversing decryption. The detailed operation of a cipher is controlled both by the algorithms and in each instance by a key. A key is a secret parameter (ideally known only to the communicants) for a specific message exchange context. Symmetric-key cryptography refers to encryption methods in which both the sender and receiver share the same key. Cryptanalysis is the study of methods for obtaining the meaning of encrypted information without access to the key normally required to do so (i.e. the study of how to "crack" encryption algorithms or their implementations).

The advanced encryption standard (AES), adopted by the US government, is one of the most popular algorithms used for symmetric key cryptography. Because of its theoretical strength and because it is relatively simple to implement in hardware, it has been adopted in many portable electronics (e.g. smart cards and readers). While the AES algorithm itself has been considered to provide adequate security for today's applications, physical implementations of the algorithm on integrated circuits (ICs), for example, may leak information such that the security information may be stolen.

Power analysis attacks have been used with great effectiveness to steal secure information from cryptographic devices. The power analysis attacks exploit the fact that the behavior of power consumption (i.e. "side-channel" information) of a cryptographic device is related to the computations performed by the cryptographic device. FIG. 1 is a normalized power trace showing the power consumed during a single AES operation performed on an IC over multiple clock cycles. Otherwise secure information may be stolen from the IC by carefully analyzing a single or multiple power traces.

A differential power analysis (DPA) attack is one form of a power analysis attack. A DPA attack uses a large number of power traces (sometimes more than a hundred thousand traces) to correlate them to a hypothetical power model of a cryptographic algorithm. The use of DPA attacks to obtain otherwise secure information has been highly effective. A DPA attack can reveal a key to the AES algorithm by analyzing less than 2000 power traces from a circuit on an IC that implements the AES algorithm (i.e. an AES core). Therefore, it is important that an AES circuit not leak a power "signature" that may be used by DPA attacks to retrieve secure information from the AES circuit.

DETAILED DESCRIPTION

Figure 1:
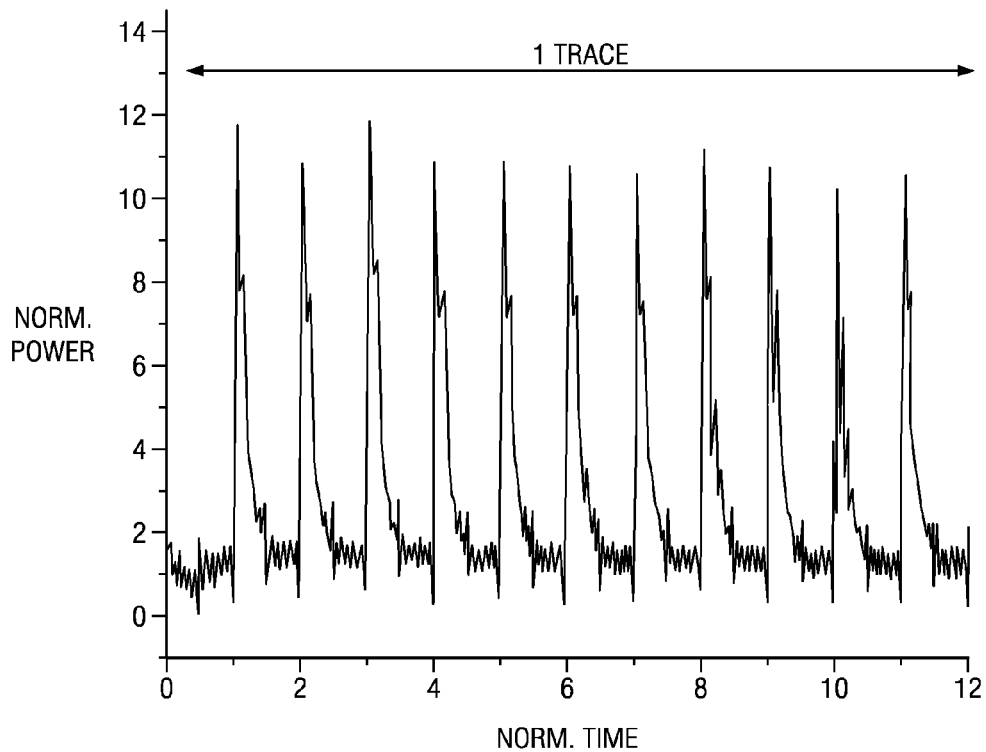
FIG. 1 is a normalized power trace showing the power consumed during a single AES operation performed on an IC over multiple clock cycles.

The drawings and description, in general, disclose a method and device for reducing the probability that secure information may be obtained by unwanted third parties from a cryptographic device. In an embodiment of the invention, a cryptographic device includes an active shunt current regulator, a low-pass filter, a linear voltage regulator and an AES (advanced encryption standard) circuit. The AES circuit encrypts information using the advanced encryption standard algorithm. The cryptographic device, in general, "hides" the power consumed by the AES circuit by preventing power "spikes" (see FIG. 1) on the electrical node that provides power to the AES circuit. For example, the electrical node that provides power to the AES circuit may be an external pin on an integrated circuit, a solder bump on integrated circuit or an electrical trace on a printed circuit board (PCB).

The low-pass filter "smooths" the power spikes on the electrical node that provides power to the AES circuit by providing charge when the AES is operating. The active shunt current regulator shunts current to ground when the AES is not drawing significant amounts of current keeping the current drawn through the electrical node substantially constant (i.e. prevents power spikes). The linear voltage regulator acts as a low-pass filter and keeps the power supply voltage on the AES circuit reasonably constant.

The cumulative effect of the low-pass filter, the linear voltage regulator and the active shunt current regulator is to smooth the power spikes on the electrical node that provides power to the AES circuit. Smoothing the power spikes on the electrical node reduces the probability that secure information created by the AES circuit may be obtained by unwanted third parties. The operation of the low-pass filter, the linear voltage regulator and the active shunt current regulator will be explained in more detail later in the specification.

Figure 2:
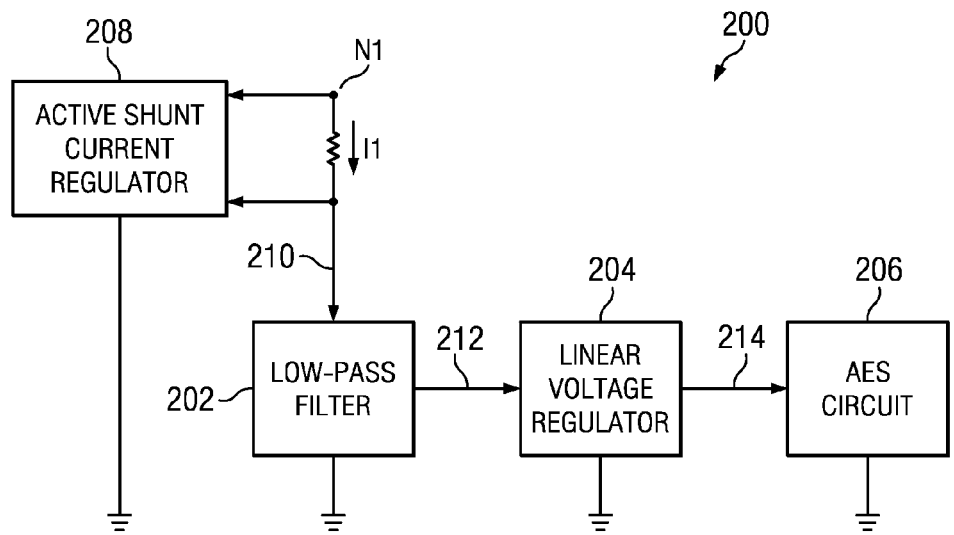
FIG. 2 is a block diagram of an first embodiment of a cryptographic device for reducing the probability that secure information may be obtained by unwanted third parties.

FIG. 2 is a block diagram of a first embodiment of a cryptographic device for reducing the probability that secure information may be obtained by unwanted third parties. In this first embodiment, an accessible electrical node N1 is connected to a first terminal of a sensing resistor R1 and an input to the active shunt current regulator 208. The accessible electrical node N1 can be any electrical node accessible to unwanted third parties. For example, the accessible electrical node may be a power pin located on an integrated circuit, a solder bump located on an integrated circuit or an electrical trace located on a printed circuit board. Unwanted third parties may use accessible electrical nodes to perform differential power analysis in order to obtain secure information.

The second terminal of the sensing resistor R1 is connected to an input of the active shunt current regulator 210 and the input of the low-pass filter 202. The output 212 of the low-pass filter 202 is connected to the input of the linear voltage regulator 204. The output 214 of the linear voltage regulator 204 is connected to the input of the AES circuit 206.

Figure 3:
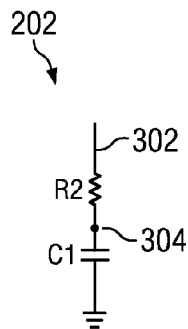
FIG. 3 is a schematic drawing of an embodiment of a passive low-pass filter.

FIG. 3 is a schematic drawing of an embodiment of a passive low-pass filter 202. In this embodiment, a first terminal of the resistor R2 is connected to the input of the passive low-pass filter 202 and a second terminal of the resistor R2 is connected to the output of the passive low-pass filter 202. Also in this embodiment, a first terminal of the capacitor C1 is connected to the output of the passive low-pass filter 202 and a second terminal of the capacitor C1 is connected to ground. The low-pass filter 202 reduces the change in current (di/dt) of current I1 being drawn through the sensing resistor R1. As a consequence, the power peaks on accessible node N1 are reduced making it more difficult to perform successful differential power analysis.

Figure 4:
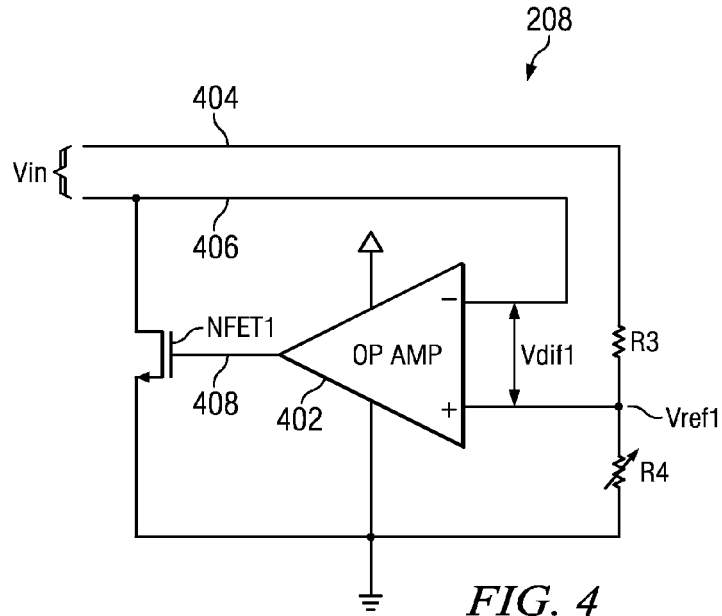
FIG. 4 is a schematic drawing of an embodiment of an active shunt current regulator.

FIG. 4 is a schematic drawing of an embodiment of an active shunt current regulator 208. In this embodiment of an active shunt current regulator 208, a first input 404 of the active shunt current regulator 400 is connected to the first terminal of a resistor R3. The second input 406 of the active shunt current regulator 208 is connected to the drain of NFET1 (n-type field-effect transistor) and to a first input of an operational amplifier 402.

A reference voltage $V_{ref1}$ is created at the second input of the operational amplifier 402 by connecting a first terminal of variable resistor R4 to the second terminal of resistor R3. The reference voltage $V_{ref1}$ can be adjusted by varying the resistance of resistor R3. The output 408 of the operational amplifier 402 is directly connected to the gate of NFET1. The source of NFET1 is connected to ground.

The voltage on node 408 is proportional to the voltage $V_{dif1}$ between the inputs 406 and $V_{ref1}$. When the voltage $V_{in}$ between the inputs 404 and 406 increases, the voltage on node 408 decreases thereby decreasing the current drawn through NFET1. When the voltage $V_{in}$ between the inputs 404 and 406 decreases, the voltage on node 408 increases thereby increasing the current drawn through NFET1. This feedback mechanism in the active shunt current regulator 208 helps to maintain the current I1 drawn through node N1 (see FIG. 1) at a substantially constant value. Because the current I1 drawn through node N1 is held at a substantially constant value, it becomes more difficult to perform successful differential power analysis and obtain secure information from the AES circuit 206.

Figure 5:
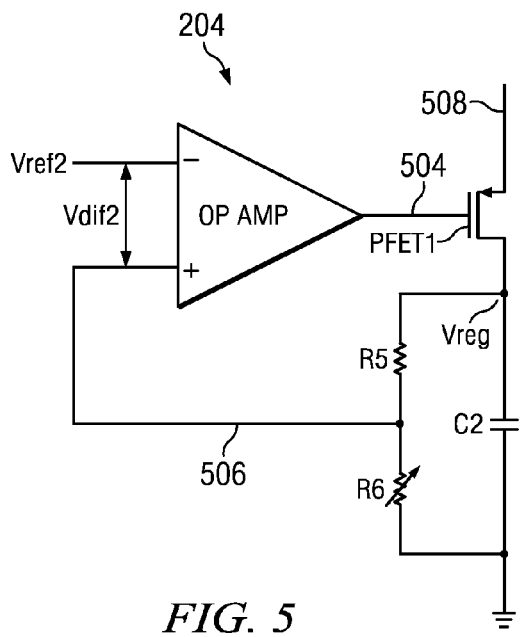
FIG. 5 is a schematic drawing of an embodiment of a linear voltage regulator.

FIG. 5 is a schematic drawing of an embodiment of a linear voltage regulator 204. In this embodiment of a linear voltage regulator 204, the input 508 of the linear voltage regulator 204 is connected to the source of a PFET1 (p-type field-effect transistor). The drain of PFET1 is connected to the output $V_{reg}$ of the voltage regulator 204. The output $V_{reg}$ of the voltage regulator 204 provides a substantially constant voltage to the AES circuit 206. Providing a substantially constant voltage to the AES circuit 206 helps the AES circuit 206 function properly.

A capacitor C2 is also directly connected to the output $V_{reg}$ of the voltage regulator 204. The capacitor C2 acts as a low-pass filter helping to maintain a substantially constant voltage on the output $V_{reg}$ of the voltage regulator 204. A first terminal of resistor R5 is connected to the output $V_{reg}$. The second terminal of resistor R5 is connected to a first input 506 of an operational amplifier 502 and to the first terminal of variable resistor R6. Varying the resistance of resistor R6 makes it possible to adjust the voltage on the first input 506 of the operational amplifier 502.

A reference voltage $V_{ref2}$ is provided to the second input of the operational amplifier 502. The reference voltage $V_{ref2}$ remains substantially constant. The difference voltage $V_{dif2}$ determines the voltage 504 provided to the gate of PFET1. The feedback from node 506 changes the difference voltage $V_{dif2}$ and as a result helps to maintain a substantially constant voltage on the output $V_{reg}$ of the voltage regulator 204.

Figure 6:
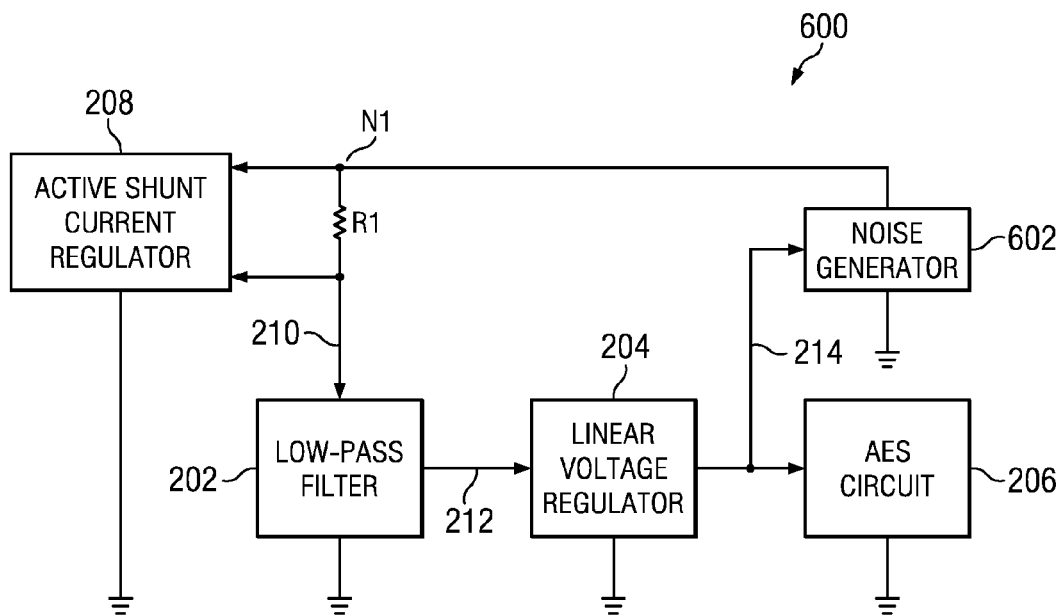
FIG. 6 is a block diagram of a second embodiment of a cryptographic device for reducing the probability that secure information may be obtained by unwanted third parties.

FIG. 6 is a block diagram of a second embodiment of a cryptographic device 600 for reducing the probability that secure information may be obtained by unwanted third parties. In this second embodiment, an accessible electrical node N1 is connected to a first terminal of a sensing resistor R1 and an input to the active shunt current regulator 208. The accessible electrical node N1 can be any electrical node accessible to unwanted third parties. For example, the accessible electrical node may be a power pin located on an integrated circuit, a solder bump located on an integrated circuit or an electrical trace located on a printed circuit board. Unwanted third parties may use accessible electrical nodes to perform differential power analysis in order to obtain secure information.

The second terminal of the sensing resistor R1 is connected to an input of the active shunt current regulator 210 and the input of the low-pass filter 202. The output 212 of the low-pass filter 202 is connected to the input of the linear voltage regulator 204. The output 214 of the linear voltage regulator 204 is connected to the input of the AES circuit 206 and to a first input of the noise generator 216. A second input of the noise generator 602 is directly connected to node N1.

The cumulative effect of the low-pass filter 202, the linear voltage regulator 204 and the active shunt current regulator 208 is to smooth the power spikes on the electrical node N1 that provides power to the AES circuit. Smoothing the power spikes on the electrical node N1 reduces the probability that secure information created by the AES circuit may be obtained by unwanted third parties.

The noise generator 602 shown in FIG. 6 does not smooth the power spikes on the electrical node N1. The noise generator 602 adds random noise to node N1. When random noise is added to node N1, it becomes more difficult to determine the secure information produced by the AES circuit.

Figure 7:
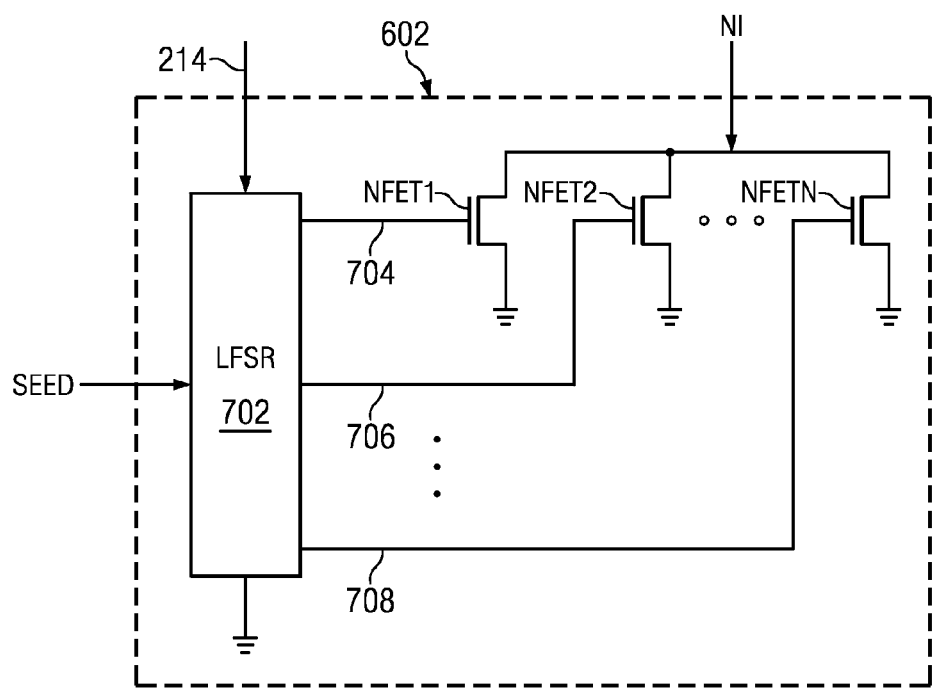
FIG. 7 is a schematic drawing of an embodiment of a noise generator.

FIG. 7 is a schematic drawing of an embodiment of a noise generator 602. In this embodiment, the noise generator 602 consists of a linear feedback shift register (LFSR) 702 and an array of transistors, NFET1, NFET2-NFETN. The LFSR generates random signals on nodes 704, 706 and 708 based on the seed used. Because the output (nodes 704, 706 and 708) of the LFSR randomly changes, the power consumed through the array of transistors is modulated, increasing the noise on node N1. The seed of the random signal generator can be updated frequently to make it more difficult for a third party to track the random patterns.

Figure 8:
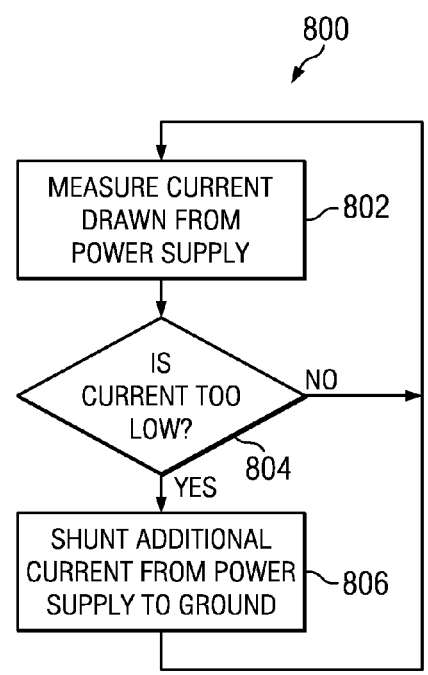
FIG. 8 is a flow chart illustrating an embodiment of a method for reducing the probability that secure information may be retrieved from a cryptographic device

FIG. 8 is a flow chart illustrating an embodiment of a method for reducing the probability that secure information may be retrieved from a cryptographic device. During a first step 802, the current drawn from a power supply is measured. After the current is measured, it is determined during step 804 when the current drawn is too low. When the current drawn is not too low, the method returns to measuring the current drawn from the power supply. When the current is too low, additional current is shunted to ground from the power supply (step 806). Shunting additional current to ground when current from the power supply is low causes the overall current drawn from the power supply to be substantially constant.

When the overall current drawn from the power supply is substantially constant it is more difficult to obtain secure information from the AES circuit 206.

The foregoing description has been presented for purposes of illustration and description. It is not intended to be exhaustive or to limit the invention to the precise form disclosed, and other modifications and variations may be possible in light of the above teachings. The embodiments were chosen and described in order to best explain the applicable principles and their practical application to thereby enable others skilled in the art to best utilize various embodiments and various modifications as are suited to the particular use contemplated. It is intended that the appended claims be construed to include other alternative embodiments except insofar as limited by the prior art.

What is claimed is:

1. A cryptographic device comprising:
   a resistor, the first resistor having first and second terminals wherein the first terminal is directly connected to an accessible electrical node wherein the accessible electrical node provides power to the cryptographic device;
   an active shunt current regulator having first and second inputs wherein the first input is directly connected to the first terminal of the resistor and the second input is directly connected to the second terminal of the resistor;
   a low-pass filter having an input and an output wherein the input is directly connected to the second terminal of the first resistor;
   a linear voltage regulator having an input and an output wherein the input of the linear voltage regulator is directly connected to the output of the low-pass filter;
   an AES (advanced encryption standard) circuit having an input wherein the input is directly connected to the output of the linear voltage regulator;
   wherein current drawn from the accessible electrical node remains substantially constant;
   wherein a voltage on the input of the AES circuit remains substantially constant;
   wherein the linear voltage regulator comprises:
   a PFET (p-type field-effect transistor) having a gate, drain and source wherein the source is directly connected to the input of the linear voltage regulator and the drain is directly connected to the output of the linear voltage regulator;
   a capacitor having a first and a second terminal wherein the first terminal is directly connected to the output of the linear voltage regulator and the second terminal is directly connected to ground;
   a resistor having a first and a second terminal wherein the first terminal is connected to the output of the linear voltage regulator;
   a variable resistor having a first and a second terminal wherein the first terminal of the variable resistor is directly connected to the second terminal of the first resistor and the second terminal of the variable resistor is directly connected to ground;
   an operational amplifier having a first input, a second input and an output wherein the first input of the operational amplifier is directly connected to the second terminal of the resistor, wherein the second input of the operational amplifier is directly connected to a first voltage reference and wherein the output of the operational amplifier is directly connected to the gate of the PFET.

2. A cryptographic device comprising:
   a resistor, the first resistor having first and second terminals wherein the first terminal is directly connected to an accessible electrical node wherein the accessible electrical node provides power to the cryptographic device;
   an active shunt current regulator having first and second inputs wherein the first input is directly connected to the first terminal of the resistor and the second input is directly connected to the second terminal of the resistor;
   a low-pass filter having an input and an output wherein the input is directly connected to the second terminal of the first resistor;
   a linear voltage regulator having an input and an output wherein the input of the linear voltage regulator is directly connected to the output of the low-pass filter;
   an AES (advanced encryption standard) circuit having an input wherein the input is directly connected to the output of the linear voltage regulator;
   wherein current drawn from the accessible electrical node remains substantially constant;
   wherein a voltage on the input of the AES circuit remains substantially constant;
   wherein the active shunt current regulator comprises:
   an NFET (n-type field-effect transistor) having a gate, drain and source wherein the drain is directly connected to the second input of the active shunt current regulator and the source is directly connected to ground;
   a resistor having a first and a second terminal wherein the first terminal is connected to the first input of the active shunt current regulator;
   a variable resistor having a first and a second terminal wherein the first terminal of the variable resistor is directly connected to the second terminal of the first resistor and the second terminal of the variable resistor is directly connected to ground;
   an operational amplifier having a first input, a second input and an output wherein the first input of the operational amplifier is directly connected to the second terminal of the resistor, wherein the second input of the operational amplifier is directly connected to the drain of the NFET and wherein the output of the operational amplifier is directly connected to the gate of the NFET.

3. A cryptographic device comprising:
   a resistor, the first resistor having first and second terminals wherein the first terminal is directly connected to an accessible electrical node wherein the accessible electrical node provides power to the cryptographic device;
   an active shunt current regulator having first and second inputs wherein the first input is directly connected to the first terminal of the resistor and the second input is directly connected to the second terminal of the resistor;
   a low-pass filter having an input and an output wherein the input is directly connected to the second terminal of the first resistor;
   a linear voltage regulator having an input and an output wherein the input of the linear voltage regulator is directly connected to the output of the low-pass filter;
   an AES (advanced encryption standard) circuit having an input wherein the input is directly connected to the output of the linear voltage regulator;
   wherein current drawn from the accessible electrical node remains substantially constant;
   wherein a voltage on the input of the AES circuit remains substantially constant;
   a noise generator connected to the accessible electrical node;
   wherein the noise generator comprises:
   a plurality of NFETs (n-type field-effect transistor) wherein each NFET in the plurality of NFETs has a gate, source and drain, wherein the plurality of NFETs are connected in parallel wherein the source of each NFET in the plurality of NFETs is directly connected to ground, wherein the drain of each NFET in the plurality of NFETs is directly connected to the accessible electrical node;

a linear feedback shift register (LFSR) having a first input, a second input and a plurality of outputs wherein the first input is directly connected to the output of the linear voltage regulator, wherein the second input is connected to a signal that provides a seed value for the LFSR, and wherein each output of the plurality of outputs is connected to a gate in the plurality of NFETs;

wherein the noise generator creates noise on the accessible electrical node to reduce the probability that secure information may be retrieved from the cryptographic device.

4. An electronic device comprising:

a cryptographic device, the cryptographic device comprising:

a resistor, the first resistor having first and second terminals wherein the first terminal is directly connected to an accessible electrical node wherein the accessible electrical node provides power to the cryptographic device;

an active shunt current regulator having first and second inputs wherein the first input is directly connected to the first terminal of the resistor and the second input is directly connected to the second terminal of the resistor;

a low-pass filter having an input and an output wherein the input is directly connected to the second terminal of the first resistor;

a linear voltage regulator having an input and an output wherein the input of the linear voltage regulator is directly connected to the output of the low-pass filter;

an AES (advanced encryption standard) circuit having an input wherein the input is directly connected to the output of the linear voltage regulator;

wherein a first voltage on the accessible electrical node remains substantially constant;

wherein a second voltage on the input of the AES circuit remains substantially constant;

wherein the linear voltage regulator comprises:

a PFET (p-type field-effect transistor) having a gate, drain and source wherein the source is directly connected to the input of the linear voltage regulator and the drain is directly connected to the output of the linear voltage regulator;

a capacitor having a first and a second terminal wherein the first terminal is directly connected to the output of the linear voltage regulator and the second terminal is directly connected to ground;

a resistor having a first and a second terminal wherein the first terminal is connected to the output of the linear voltage regulator;

a variable resistor having a first and a second terminal wherein the first terminal of the variable resistor is directly connected to the second terminal of the first resistor and the second terminal of the variable resistor is directly connected to ground;

an operational amplifier having a first input, a second input and an output wherein the first input of the operational amplifier is directly connected to the second terminal of the resistor, wherein the second input of the operational amplifier is directly connected to a first voltage reference and wherein the output of the operational amplifier is directly connected to the gate of the PFET.

5. An electronic device comprising:

a cryptographic device, the cryptographic device comprising:

a resistor, the first resistor having first and second terminals wherein the first terminal is directly connected to an accessible electrical node wherein the accessible electrical node provides power to the cryptographic device;

an active shunt current regulator having first and second inputs wherein the first input is directly connected to the first terminal of the resistor and the second input is directly connected to the second terminal of the resistor;

a low-pass filter having an input and an output wherein the input is directly connected to the second terminal of the first resistor;

a linear voltage regulator having an input and an output wherein the input of the linear voltage regulator is directly connected to the output of the low-pass filter;

an AES (advanced encryption standard) circuit having an input wherein the input is directly connected to the output of the linear voltage regulator;

wherein a first voltage on the accessible electrical node remains substantially constant;

wherein a second voltage on the input of the AES circuit remains substantially constant;

wherein the active shunt current regulator comprises:

an NFET (n-type field-effect transistor) having a gate, drain and source wherein the drain is directly connected to the second input of the active shunt current regulator and the source is directly connected to ground;

a resistor having a first and a second terminal wherein the first terminal is connected to the first input of the active shunt current regulator;

a variable resistor having a first and a second terminal wherein the first terminal of the variable resistor is directly connected to the second terminal of the first resistor and the second terminal of the variable resistor is directly connected to ground;

an operational amplifier having a first input, a second input and an output wherein the first input of the operational amplifier is directly connected to the second terminal of the resistor, wherein the second input of the operational amplifier is directly connected to the drain of the NFET and wherein the output of the operational amplifier is directly connected to the gate of the NFET.

* * * * *